United States Patent [19]

Hobart

[11] 3,957,126

[45] May 18, 1976

[54] FEED CONTROL SYSTEM

[75] Inventor: Jack Hobart, Leamington Spa, England

[73] Assignee: Hobart Engineering Limited, Stratford-upon-Avon, England

[22] Filed: July 17, 1974

[21] Appl. No.: 489,494

[30] Foreign Application Priority Data

July 17, 1973 United Kingdom............... 34039/73

[52] U.S. Cl.............................. 177/122; 177/121; 177/DIG. 11
[51] Int. Cl.² ...................................... G01G 13/02
[58] Field of Search............ 177/1, 52, 60, 116–123, 177/210, DIG. 11, DIG. 6

[56] References Cited
UNITED STATES PATENTS

| | | | |
|---|---|---|---|
| 2,455,532 | 12/1948 | Sunstein | 177/DIG. 6 |
| 3,117,639 | 1/1964 | Preeben | 177/DIG. 11 |
| 3,477,529 | 11/1969 | Burn et al. | 177/164 |
| 3,578,094 | 5/1971 | Henry | 177/119 |
| 3,627,101 | 12/1971 | McClusky | 177/53 |
| 3,690,391 | 9/1972 | Rust | 177/1 |
| 3,724,569 | 4/1973 | Blodgett | 177/116 |
| 3,799,280 | 3/1974 | Parts | 177/120 |
| 3,828,869 | 8/1974 | Sellers | 177/1 |
| 3,834,473 | 9/1974 | Girard et al. | 177/1 |

Primary Examiner—L. T. Hix
Assistant Examiner—Vit W. Miska
Attorney, Agent, or Firm—Holman & Stern

[57] ABSTRACT

A feed control system, for controlling the operation of a weighing apparatus including two or more conveyors arranged in flow series and arranged to carry product from a feeder to a hopper whereby the product will be separated into batches of predetermined weight, the control system providing adjustment of the feed rate of the conveyors, and adjustment of the rate of feed of product by each conveyor in relation to the weight of product on a succeeding conveyor in the series.

11 Claims, 6 Drawing Figures

FEED CONTROL SYSTEM

The invention relates to a feed control system for controlling the operation of a weighing apparatus of the kind including two or more conveyors arranged in flow series, and arranged to carry a quantity of product from a feeder to a hopper whereby the product will be separated into batches of predetermined weight. The invention is particularly, but not exclusively, concerned with the control of a feeding and weighing system for light, free-flowing products such as potato crisps or similar lightweight food products.

Previous proposals for controlling feed have controlled only part of the weighing system or one or a limited number of the other basic elements of control, for example the quantity of product delivered by the conveyors or, where the conveyors are vibratory, controlling the degree of vibration applied to the conveyors. Such prior proposals are not entirely satisfactory in that by controlling, for example, only the degree of vibration applied to the conveyors, only a limited amount of variation in total flow of product will be accomplished without varying the actual quantity of product available. If only the quantity of product is controlled, the product may not be conveyed as a smooth flow through the system, due to varying amounts of product being added without varying the rate of flow of the product. These previous arrangements also suffer from the disadvantage that bunching of product or gaps in the flow through the system may occur.

An object of the invention is to mitigate these disadvantages.

According to the invention a feed control system, for controlling the operation of a weighing apparatus including two or more conveyors arranged in flow series and arranged to carry product from a feeder to a hopper whereby the product will be separated into batches of predetermined weight, includes feed rate adjusting means for adjusting the feed rate of each conveyor, weight detecting means operatively connected to each conveyor for detecting the weight of product on each conveyor, and first control means responsive to said weight detecting means for controlling the rate of feed of product by each conveyor in relation to the weight of product on a succeeding conveyor in the series.

The apparatus may include second control means operable to control the rates of feed of all the conveyors simultaneously.

The apparatus may further include a timer mechanism arranged to control the operation of the conveyors and which defines an adjustable predetermined time cycle for completing each weighed batch of product, said second control means being arranged to override said timer mechanism if the desired weight of product in the hopper is reached before or after the end of said time cycle.

Preferably the second control means is operable to increase the rates of feed of all the conveyors if the desired weight of product in the hopper is not reached until after the end of said time cycle, or to decrease the rates of feed of the conveyors if said desired weight of product is reached before the end of said time cycle.

Further timer mechanisms may be provided for limiting the override of the first mentioned timer mechanism by the second control means.

The weight detecting means for the feed conveyors may each comprise a weighing device and sensing means for sensing the weight of the product on the conveyors detected by the weighing device, the sensing means providing a variable input signal, and an output signal, the output signal being arranged to vary in accordance with the weight detected and also in accordance with the level of the input signal.

The level of the input signal may be varied by the second control means where the desired weight of product in the hopper is reached before or after said time cycle has elapsed.

A feed control system in accordance with the invention will now be described by way of example with reference to the accompanying drawings in which.

Figure 1:
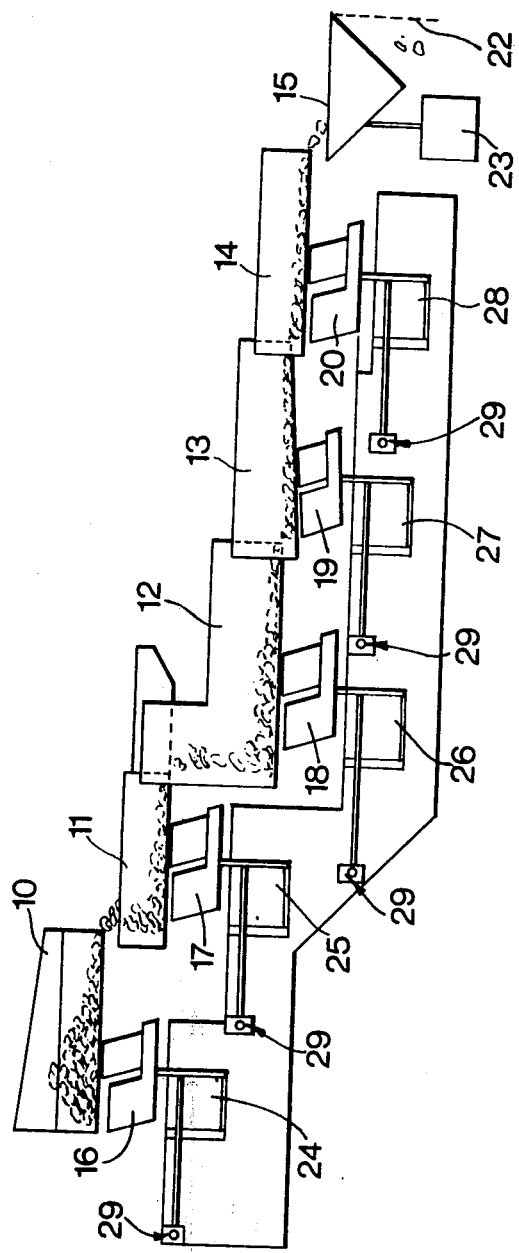
FIG. 1 is a schematic side elevation of a weighing apparatus.
Figure 2:
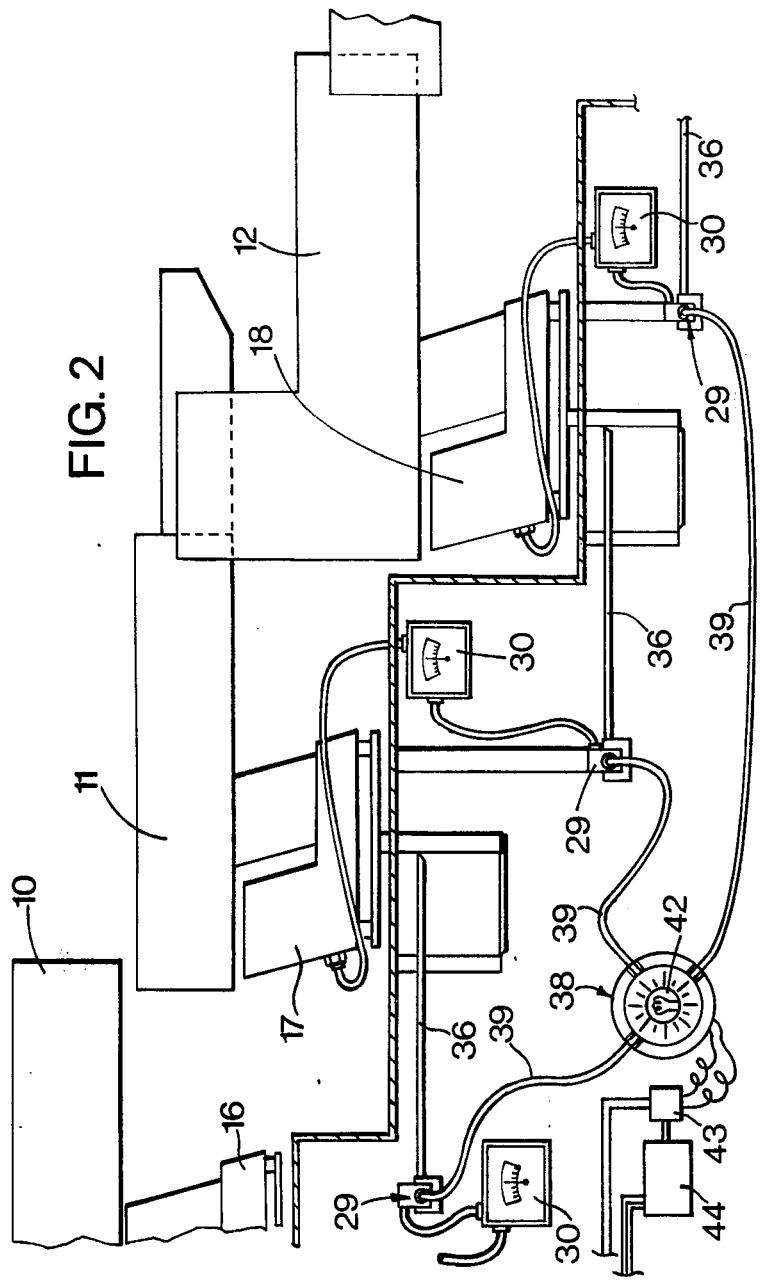
FIG. 2 is a schematic side elevation of part of the weighing apparatus of FIG. 1 drawn to a larger scale.

Referring firstly to FIGS. 1 and 2, a weighing apparatus for separating a quantity of divided product into batches of predetermined weight includes five vibratory conveyor pans 10, 11, 12, 13 and 14 arranged in series. If desired, a number of conveyor pans other than five may be used. The pan 10 defines a receiving pan for receiving product from an overhead conveyor (not shown), and the pan 14 is a discharge pan from which the product is discharged into a receiving hopper 15. Each of the pans has vibrating means 16, 17, 18, 19 and 20 respectively by which the pans are vibrated to cause product resting thereon to be conveyed towards the forward ends of the pans.

The receiving hopper 15 is provided with a releasable door 22 to enable the hopper to be discharged when the desired weight of product has been received. Normally the hopper 15 will be discharged into a suitable packet (not shown) which is formed and presented for receiving the product by an auxiliary packaging device (not shown).

The weight of product in the hopper 15 is detected by a weighing scale 23 and each of the pans 10 to 14 is also provided with a weighing scale 24, 25, 26, 27 and 28 respectively whereby the weight of product in the associated pan may be detected. Each of the weighing scales may be of any suitable kind; for example a balance beam, a spring cantilever or a hanger spring. The weight of product detected by each scale 24 to 28 is sensed by a sensor 29 associated with each scale and which will be hereinafter described.

A power controller 30 (see FIG. 2) for each vibrating means 16 to 20 is arranged to vary the power input to the vibrating means and thereby control the rate at which the associated pan will vibrate. Each power controller 30 is manually adjustable and is also adjustable in response to a signal received from its associated sensor 29.

Figure 3:
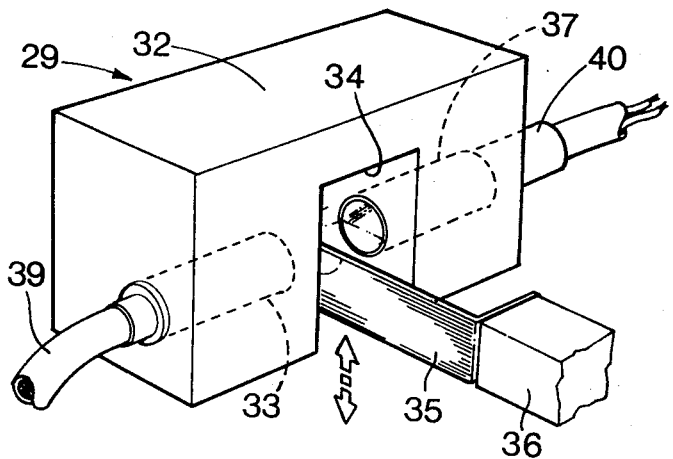
FIG. 3 is a perspective view of an optical-type sensor for the apparatus shown in FIGS. 1 and 2.

In the arrangement shown in FIG. 2, each sensor 29 is an optical-type sensor. As shown in FIg. 3, each sensor comprises a block 32 having an opening 33 at one side for an input optical signal, and a central opening 34 through which extends a scale flag 35 carried on a scale beam 36. The flag 35 extends across the path of the optical signal to a greater or lesser degree depending on the weight of product in the associated pan, and thereby controls the amount of light passing from the opening 33 to a coaxial opening 37 formed in the other side of the block. The input signal to all the sensors 29 is delivered from a central variable intensity light source 38 along groups of fibre optic rods so that the input signal is the same for all the sensors 29. Each group of fibre optic rods is enclosed in a sheath 39. A photoelectric cell 40 is arranged in, or in alignment with, each opening 37 and converts the optical signal into an electrical output signal for controlling the power controller 30 associated with the preceding pan in the series. The light source 38 comprises an electric lamp 42 which is energised via a dimmer unit 43 controlled by a servo motor 44.

Figure 4:
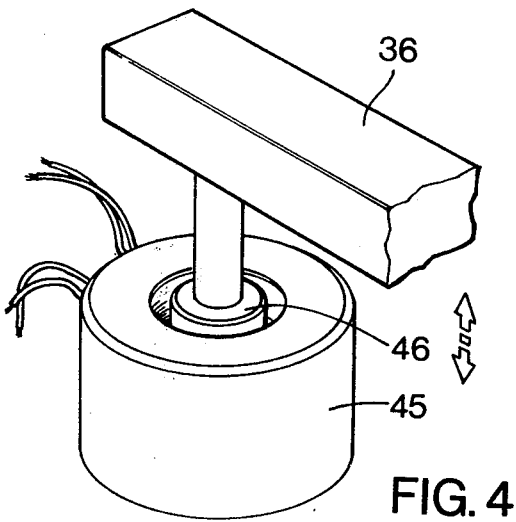
FIG. 4 is a perspective view of a transducer for use as an alternative to the optical-type sensor shown in FIG. 3.

As an alternative to the optical-type sensor of FIG. 3, the sensor may be in the form of an electrical transducer 45 as shown in FIG. 4. The transducer 45 receives an electrical input signal, and axial movement of a transducer core rod 46 produces a variable output signal from the transducer 45 for controlling the power controller 30 associated with the preceding pan in the series. Each transducer core rod 46 is attached to the beam 36 of the succeeding conveyor pan in the series. In a similar way to the optical control system, the electrical input signals to the transducers 45 are derived from a common source and are variable simultaneously in accordance with a further control system to be described.

It will be seen that by using either type of sensor, it is possible to vary the feed rate of the conveyor pan preceding that with which the sensor is associated. Thus the weight detected by the weighing scale of one pan determines the feed rate of the preceding pan.

On setting up the system, the quantity of product to be delivered by each conveyor pan is first determined. The power controllers are then manually adjusted so that for this amount of product, the feed rate of the preceding conveyor pan is nil and no product flows through the system. As soon as product is fed from a conveyor pan, the scale beam 36 of that pan will move and thereby change the signal passed from the associated sensor 29 to the power controller 30 of the preceding pan to increase the feed from that preceding pan to the first mentioned pan, so replacing the product. The other pans in the system function similarly and the overall rate of flow of product throughout the system remains generally constant. Each conveyor pan vibrates as required to achieve a nil rate of feed in the next pan of the series. If the input signal to all the sensors 29 is simultaneously increased or decreased, then the nil level is increased or decreased accordingly.

Figure 6:
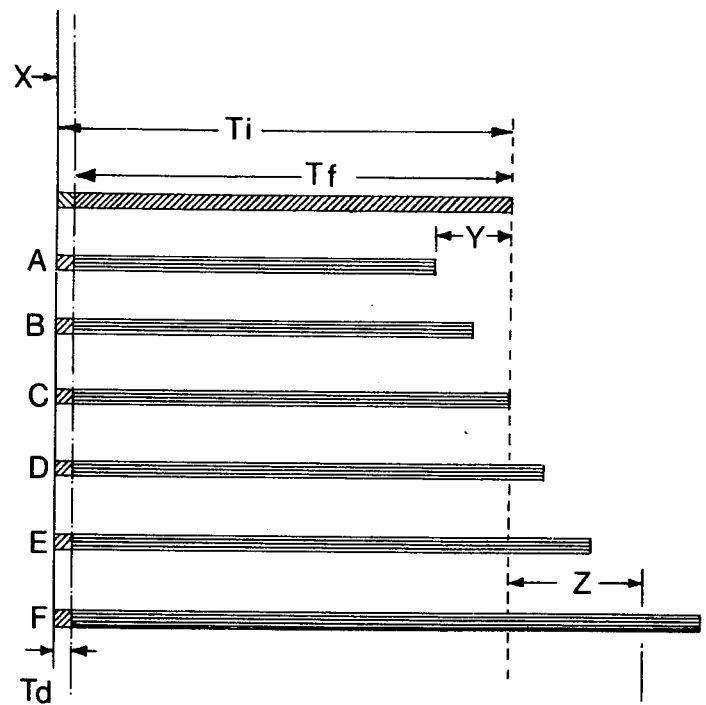
FIG. 6 is a chart illustrating variations in time taken to complete a batch of product of predetermined weight compared to a predetermined ideal cycle time.

Referring now to FIG. 6, the weighing and feeding of each batch of product is subject to a timed cycle. The ideal cycle time Ti is calculated on the basis of the speed of the packaging system or on the basis of the highest feed rate that can be comfortably achieved. Thus, ideally, the feeding system will convey the weight of product for each batch into the hopper in said ideal cycle time Ti. The ideal cycle time consists of the feed time Tf, plus the hopper dump time Td, i.e., the time for emptying the hopper 15, plus the time for closing the hopper door 22 after emptying. The door close time plus the hopper dump time Td is fixed for a given product and a given weight of batch but the feed time may vary. Therefore the total cycle time may be varied by changing the feed rate of the system. The start up of feed, indicated at X in FIG. 6, for the next cycle is delayed during the door close period to ensure that all product for the next weighed batch of product is captured in the hopper and does not pass through with the previous batch of product. If the required weight of product is fed into the hopper before the end of the ideal feed time Ti, as shown at A and B in FIG. 6, the feed rate of all the conveyor pans should be decreased for the next batch to bring the feed running time up to Ti as indicated at C in FIG. 6. If the required weight is not received until after the ideal feed time Ti, as shown at D, E and F in FIG. 6, the feed rate of the pans has to be increased for the next batch.

Figure 5:
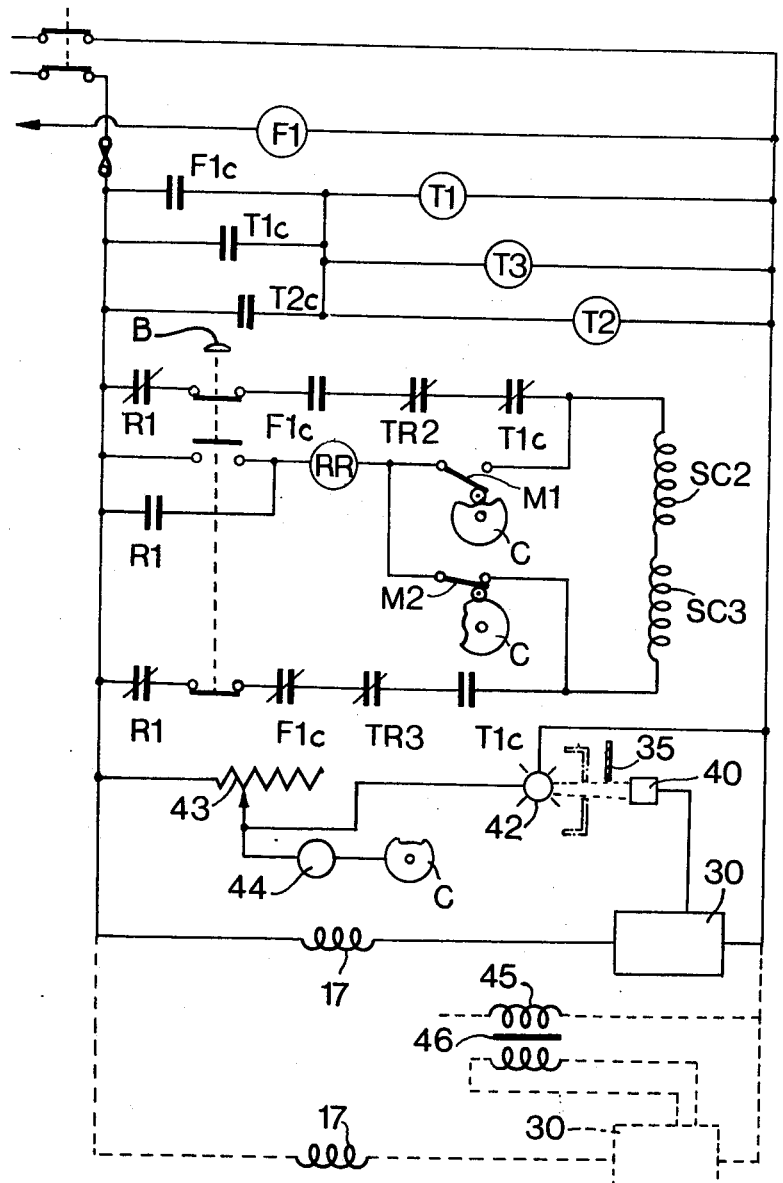
FIG. 5 is a circuit diagram of control means for the weighing apparatus shown in FIGS. 1 and 2.

To provide this facility, the input signals to the sensors 29 are controlled by a central control system shown diagrammatically in FIG. 5. The control system includes a feed relay F1, having contacts F1$_c$,' and a master timing relay T1 which is set to the ideal feed time Ti, having contacts T1$_c$, for the system. Two further auxiliary timers T2 and T3 are provided to limit the amount of feed rate correction for any one cycle. The timers T2 and T3 are intended to prevent over-correction for any one weighing cycle which could result in the system going from too fast to too slow in successive cycles and cause the system to 'hunt'. The timers T2 and T3 are themselves adjustable since the maximum allowable correction which will not cause 'hunting' to increase the time allowed for feeding. The maximum decrease and increase corrections are indicated at Y and Z respectively in FIG. 6. The timer T3 cannot operate until a maximum time has elapsed since commencement of feeding. The timer T2 limits the maximum running time of the servo motor 44. The servo motor 44 is associated with decreasing and increasing coils SC2 and SC3 respectively. If the scale 23 of the hopper makes weight before the end of the ideal feed time Ti, then power is transmitted to SC2. Alternatively, if the scale 23 of the hopper makes weight after the end of the ideal feed time Ti, then power is transmitted to SC3. The servo motor 44 thus controls the dimmer unit 43 appropriately to change the input signal to all the sensors 29 simultaneously. The change in input signal changes the feed rate of the whole system thereby increasing or decreasing the total balanced flow of the system as required to adjust the feeding time in relation to the ideal feed time.

The control system also includes a reset facility for bringing the rate of feed of the product back from its adjusted level reached after operation of the control system to the original fixed rate of feed. The original rate of feed is set to give a time cycle which is ideal for a product having average size and density and with the conveyor pans in a clean condition. After the system has been run for some time, the conveyor pan speed is normally greater than it was initially to compensate for the build-up of residual product on the pans. When the pans are cleaned in the normal course of maintenance or when the nature of the product is to be changed, it is desirable that the initial conveyor speed should, after cleaning, be the same as the original speed because on start up of the conveyor pans it is likely that the feed rate will otherwise be too fast, due to the product flowing more freely on the clean pans.

A reset cam C is carried on the servo motor shaft and is arranged to operate microswitches M1 and M2 one of which is normally open and the other closed. The cam c is arranged so that one of the microswitches is always in a closed position except when the cam C is in one position at which both switches M1 and M2 are open. Should the dimmer unit 43 be at a point above that determined as normal feed for clean pans, the microswitch M1 will be closed to pass current through the coil SC2 to drive the servo motor 44 in the decrease power direction. Similarly, should the dimmer unit 43 be at a point below that determined as average, then the microswitch M2 will be closed to pass current through the coil SC3 to drive the servo motor 44 in the increase power direction.

At the position of the cam C when both microswitches M1 and M2 are open, the servo motor 44 will stop. Thus to reset the system to the ideal feed time Ti, the reset cam C is returned to this position by operation of a reset button B which actuates a reset relay RR having contacts $R_1$.

The reset cam C can be adjusted on its shaft relatively to the servo motor 44 and thus the dimmer unit 43. Therefore the point chosen for the ideal feed rate can be adjusted as required.

On start up of the feeder system after the reset button B is operated, the system will work from the ideal feed cycle with corrections being made as before in accordance with the operation of the timers.

The provision of the reset arrangement makes it possible to lock the feed rate adjustment means away from the operator to avoid tampering, but the operator can still set up the ideal feed rate, when desired, without the need for an experienced machine operator.

The portion of the circuit in FIG. 5 shown in dotted lines is part of an alternative arrangement whereby the feed rate is adjusted by a transducer of the kind shown in FIG. 4 instead of by the adjustable intensity light source.

Instead of using a common light source 38, each sensor may have an associated lamp powered from a common adjustable power source so that each lamp receives the same power input.

The provision of a control system according to the invention whereby a change in the quantity of product on any one conveyor pan is detected and a corresponding alteration in feed rate is made to the preceding pan in the series, gives a smoother flow of product than hitherto and provides a system with the capability of relatively higher conveying rates. Systems in which only limited numbers of conveyor pans are controlled may give rise to bunching or gaps in the flow of product to and from such pans. The present system is so controlled that if, for any reason, product is added to or removed from any pan in the system, the feed rates of the remaining pans are automatically adjusted to cater for the change until all the pans have resumed their normal rates of flow.

The control system also enables the operating speed of all the pans to be increased or decreased simultaneously to change the feed rate, or to compensate for a reduction or increase in feed rate for a given operating speed.

As well as being able to operate with the weighing apparatus described, the control system can also be arranged to operate with a feed system which allows the conveyor pans to continue running after the hopper has been filled by providing a gate or the like to stop the flow of product into the hopper while the hopper is being emptied. The control system is particularly useful for controlling a weighing apparatus of the kind described in co-pending British Patent Application No. 34038/73.

The vibratory conveyor pans described may be replaced by variable speed belt conveyors if desired and if such conveyors are suitable for the product.

What I claim as my invention and desire to secure by Letters Patent of the United States is:

1. A feed control system, for controlling the operation of a weighing apparatus which includes three or more conveyors arranged in flow series and arranged to carry product from a feeder to a hopper provided with hopper weight detecting means whereby the product will be separated into batches of predetermined weight, comprising separate feed rate adjusting means operatively connected to the first and second conveyors of the series, separate conveyor weight detecting means operatively connected to the second and third conveyors of said series, a first control means connected to control said feed rate adjusting means of said first conveyor, and a second control means connected to control said feed-rate adjusting means of the second conveyor, the first control means being operable in response to the weight detecting means of the second conveyor, and the second control means being operable in response to the weight detecting means of the third conveyor, whereby the rate of feed of the first conveyor will be dependent on the weight of product in the succeeding conveyors.

2. A feed control system as in claim 1, comprising further control means operable to control the rates of feed of all the conveyors simultaneously.

3. A feed control system as in claim 2, in which a timer mechanism is provided for controlling the operation of the conveyors, a predetermined time cycle being defined by said timer mechanism for completing each weighed batch of product, said further control means being arranged to override said timer mechanism and vary the rates of feed of all the conveyors if the desired weight of product in the hopper is reached before or after the end of said time cycle.

4. A feed control system as in claim 2, in which each said conveyor weight detecting means comprises a weighing device and sensing means for sensing the weight of the product on its associated conveyor, a variable input signal and a variable output signal being provided by said sensing means, said output signal varying in accordance with the weight detected and also in accordance with the level of said input signal.

5. A feed control system as in claim 3, in which said further control means is operable to increase the rates of feed of all the conveyors if the desired weight of product in the hopper is not reached until after the end of said time cycle, or to decrease the rates of feed of the conveyors if said desired weight of product in the hopper is reached before the end of said time cycle.

6. A feed control system as in claim 3, in which further timer mechanisms are provided for limiting the override of the first mentioned timer mechanism by the further control means.

7. A feed control system as in claim 4, in which said input signal is varied by said further control means where the desired weight of product in the hopper is reached before or after said time cycle has elapsed.

8. A feed control system as in claim 4, in which said variable input signal is an optical signal, a variable intensity light source being operable to transmit said optical signal.

9. A feed control system as in claim 4, in which said sensing means includes an electrical transducer, an electrical input signal for said transducer constituting said variable input signal.

10. A feed control system as in claim 4, in which the optical input signal is transmitted from said variable light source along optical fibre rods.

11. A feed control system as in claim 8, in which the sensing means associated with each conveyor weight detecting means includes a member defining an opening through which the optical input signal will pass, means carried by said conveyor weight detecting means arranged to extend across the opening in the path of said input signal, and light-responsive means on said member for receiving the optical input signal, said means carried by the conveyor weight detecting means being arranged to control the amount of light received by the light-responsive means dependent on the weight of product in the associated conveyor.

* * * * *